(12) United States Patent
Liu et al.

(10) Patent No.: US 11,755,870 B1
(45) Date of Patent: Sep. 12, 2023

(54) LIGHT EMITTING ELECTRONIC CARD

(71) Applicant: BEAUTIFUL CARD CORPORATION, Taoyuan (TW)

(72) Inventors: Jen-Hsiang Liu, Taoyuan (TW); Jung-Hsiu Chen, Taoyuan (TW)

(73) Assignee: BEAUTIFUL CARD CORPORATION, Taoyuan (TW)

( * ) Notice: Subject to any disclaimer, the term of this patent is extended or adjusted under 35 U.S.C. 154(b) by 0 days.

(21) Appl. No.: 18/088,802

(22) Filed: Dec. 27, 2022

(30) Foreign Application Priority Data

Jun. 17, 2022 (TW) .................................. 111122717

(51) Int. Cl.
*F21V 8/00* (2006.01)
*G06K 19/077* (2006.01)
*G06K 19/07* (2006.01)

(52) U.S. Cl.
CPC ..... *G06K 19/07705* (2013.01); *G02B 6/0021* (2013.01); *G02B 6/0035* (2013.01); *G06K 19/0723* (2013.01); *G06K 19/07722* (2013.01)

(58) Field of Classification Search
CPC ......... G06K 19/07705; G06K 19/0723; G06K 19/07722; G02B 6/0021; G02B 6/0035
See application file for complete search history.

(56) References Cited

U.S. PATENT DOCUMENTS

| | | | | |
|---|---|---|---|---|
| 2015/0317553 | A1* | 11/2015 | Pueschner | G06K 19/077 235/492 |
| 2018/0357522 | A1* | 12/2018 | Roach | G06K 19/06084 |
| 2020/0160135 | A1* | 5/2020 | Lowe | G06K 19/07705 |

* cited by examiner

*Primary Examiner* — Donald L Raleigh (57) ABSTRACT

A light emitting electronic card includes a card body, an electronic control module, a light emitting module and a light guide module. The card body includes a panel, a base plate, a light transmissive portion, a first light shielding portion and a second light shielding portion. The electronic control module is disposed at the card body, and includes a circuit control carrier board and a non-contact type radio-frequency (RF) antenna or a contact type communication chip. The light emitting module is disposed in the card body and is electrically connected to the circuit control carrier board. The light guide module is disposed in the card body and corresponds to the light emitting module, includes a light source focusing portion corresponding to the light transmissive portion, and guides a light source of the light emitting module to the light transmissive portion by the light source focusing portion.

10 Claims, 8 Drawing Sheets

LIGHT EMITTING ELECTRONIC CARD

CROSS-REFERENCE TO RELATED APPLICATION

This non-provisional application claims priority under 35 U.S.C. § 119(a) on Patent Application No(s). 111122717 filed in Taiwan, R.O.C. on Jun. 17, 2022, the entire contents of which are hereby incorporated by reference.

BACKGROUND OF THE INVENTION

1. Field of the Invention

The present disclosure provides an electronic card, and in particular to an electronic card having light emitting display.

2. Description of the Related Art

A conventional portable card, such as a debit card, credit card, stored value card, transportation card, health insurance card and natural person certificate, is categorized into a contact type or a non-contact type according to the way of use. A contact type card has a chip that is exposed from the surface of the card to perform an electrical contact with an external card reader, allowing the card reader to read data required from the chip and accordingly perform a transaction. A non-contact type card is embedded with a sensing coil and a radio-frequency identification (RFID) tag thereof, and is brought close to a reading module to allow mutual sensing between an antenna of the reading module and the sensing coil of the card to further generate electrical power, so that the reading module is able to read data of the RFID tag and accordingly perform a required transaction.

However, for either a contact-type card or a non-contact type card, the card itself does not have any mechanism for providing a prompt to a user. Thus, during a transaction, a consumer, instead of being able to initiatively determine a status of the transaction, can only rely on a merchandiser so as to be notified of whether the transaction is complete. As a result, during or after the transaction, personal data in an RFID tag and transaction data may be illegally acquired by associated devices of merchandisers with ill intentions.

Therefore, it is an object of the present disclosure to disclose a light emitting electronic card capable of achieving a prompt effect while a card body performs personal data or transaction data exchange as well as providing an aesthetic visual effect, thereby improving the drawbacks of the prior art.

BRIEF SUMMARY OF THE INVENTION

In view of the above drawbacks and imperfections of the prior art, on the basis of extensive development and research, the applicant has provided a light emitting electronic card, in the aim of achieving a prompt effect during personal data or transaction data exchange as well as providing an aesthetic visual effect.

To achieve the above and other objects, the present disclosure provides a light emitting electronic card including a card body, an electronic control module, a light emitting module and a light guide module. The card body includes a panel and a base plate, wherein the panel is layered and assembled at the base plate. The panel includes a light transmissive portion and a first light shielding portion, and the base plate is provided with a second light shielding portion, wherein the first light shielding portion is opposite to the second light shielding portion. The electronic control module is disposed in the card body, and includes a circuit control carrier board and a non-contact type radio-frequency (RF) antenna or a contact type communication chip. The non-contact type RF antenna is disposed at the circuit control carrier board, or the contact type communication chip is disposed in the circuit control carrier board. The light emitting module is disposed in the card body and is electrically connected to the circuit control carrier board. The light guide module is disposed in the card body and corresponds to the light emitting module, includes a light source focusing portion that corresponds to the light transmissive portion, and guides a light source of the light emitting module to the light transmissive portion by the light source focusing portion.

In the above light emitting electronic card, the electronic control module, the light emitting module and the light guide module are arranged between the first light shielding portion and the second light shielding portion.

In the above light emitting electronic card, the light transmissive portion is located at a center of the first light shielding portion, the light source focusing portion is located at a center of the light guide module and corresponds to the light transmissive portion, and the light emitting module is located around the light source focusing portion, such that the light guide module guides the light source of the light emitting module to the light transmissive portion by the light source focusing portion.

In the above light emitting electronic card, the light transmissive portion is located outside a center of the first light shielding portion, the light source focusing portion is located outside a center of the light guide module and corresponds to the light transmissive portion, and the light emitting module is located on one side of the light source focusing portion, such that the light guide module guides the light source of the light emitting module to the light transmissive portion by the light source focusing portion.

In the above light emitting electronic card, the light emitting module includes at least one light emitter, and the light guide module has at least one through hole that accommodates the light emitter.

In the above light emitting electronic card, the light emitter is a side light emitting diode having a light source path directed toward the light source focusing portion.

In the above light emitting electronic card, the light source focusing portion has luminous ink or photosensitive ink.

In the above light emitting electronic card, the panel and the base plate are combined by means of a loop light source focusing portion, which is connected to a periphery of the light guide module and a periphery of the electronic control module.

In the above light emitting electronic card, the loop light source focusing portion has luminous ink or photosensitive ink.

In the above light emitting electronic card, the light source focusing portion is a light focusing notch, and the light source of the light emitting module is refracted by a long side of the light focusing notch to the light transmissive portion.

In the above light emitting electronic card, the light guide module further includes a photosensitive ink layer, which is located below the light source focusing portion.

Thus, in the light emitting electronic card of the present disclosure, when the card body performs personal data or transaction data exchange, the electronic control module drives the light emitting module, and the light source of the light emitting module is guided to the light transmissive portion by the light source focusing portion, enabling the card body to display a data exchange message, and achieving a prompt function as well as an aesthetic visual effect.

DETAILED DESCRIPTION OF THE INVENTION

To facilitate understanding of the object, characteristics and effects of this present disclosure, embodiments together with the attached drawings for the detailed description of the present disclosure are provided.

Figure 1:
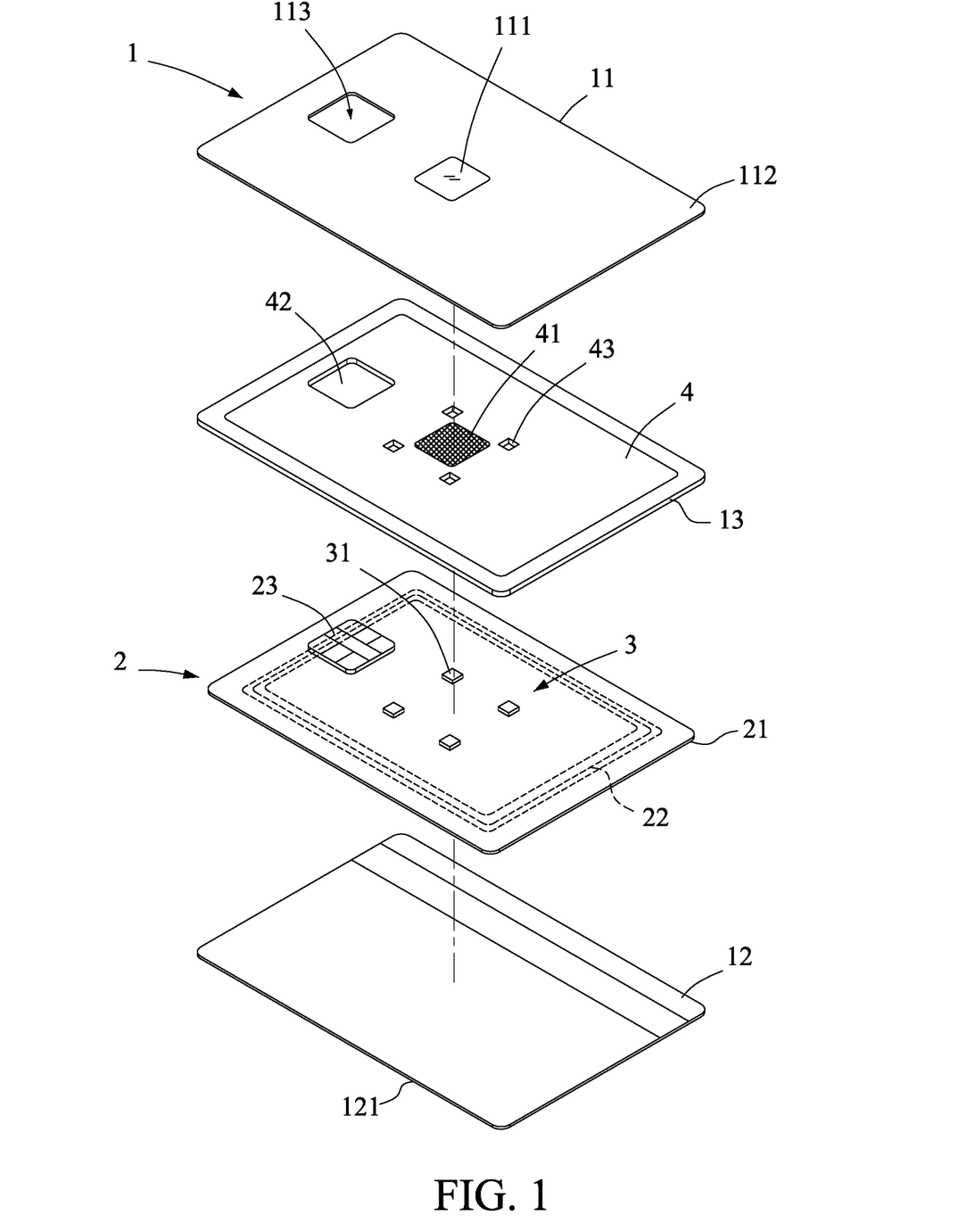
FIG. 1 is an exploded schematic diagram according to a first preferred embodiment of the present disclosure.
Figure 2:
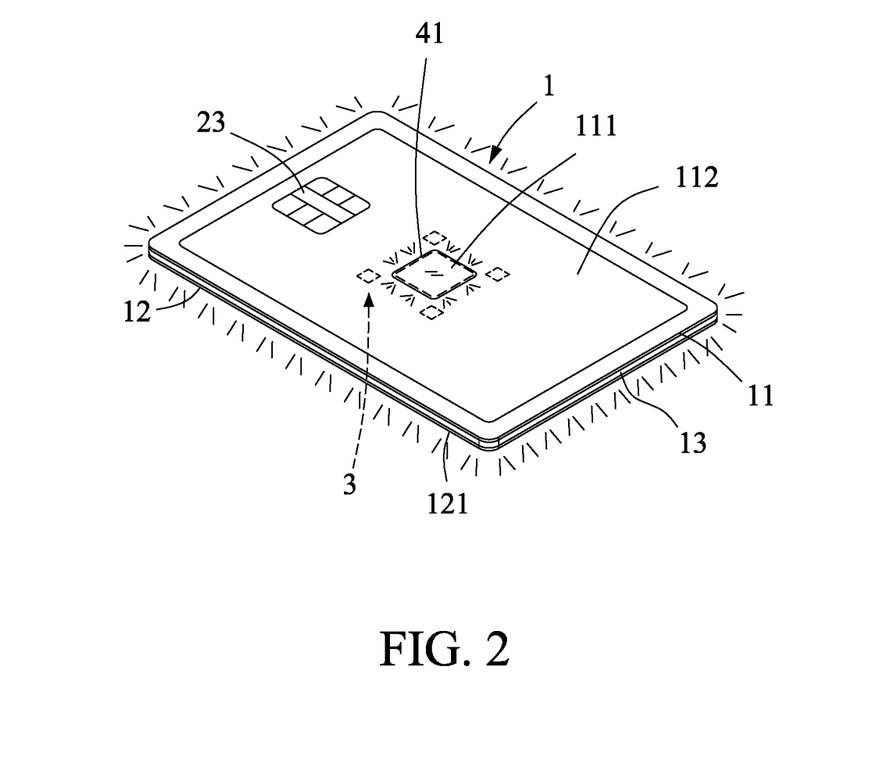
FIG. 2 is a schematic diagram of an appearance according to the first preferred embodiment of the present disclosure.
Figure 3:
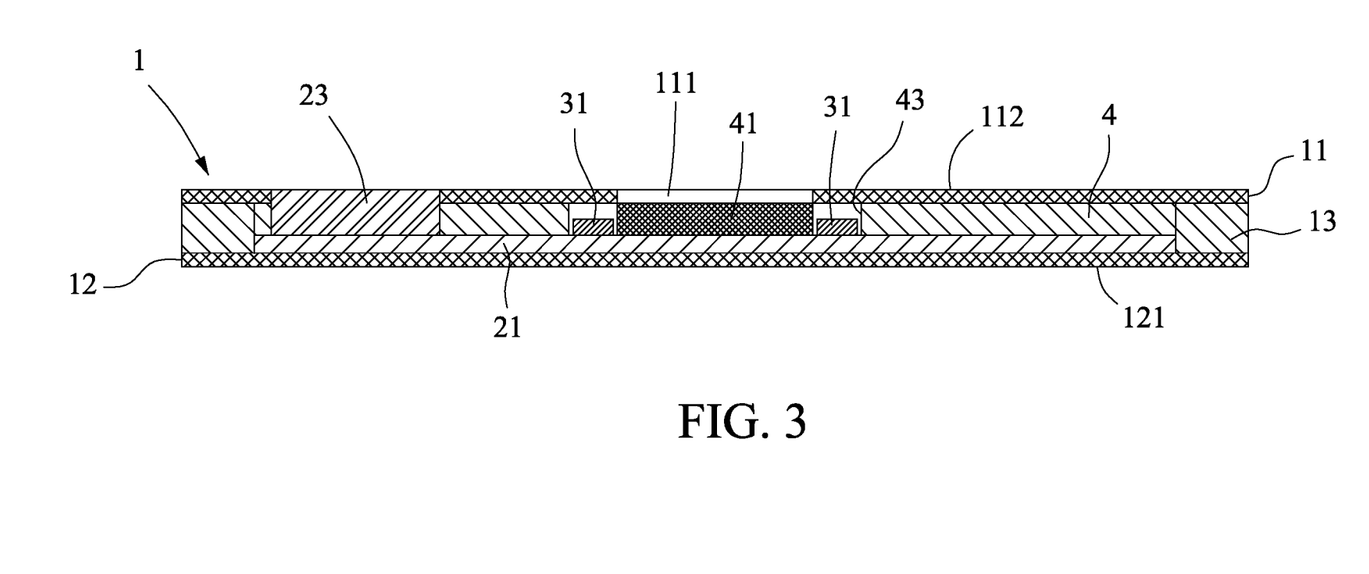
FIG. 3 is a section schematic diagram according to the first preferred embodiment of the present disclosure.

Refer to FIG. 1 to FIG. 3. As shown in the drawings, the present disclosure provides a light emitting electronic card at least including a card body 1, an electronic control module 2, a light emitting module 3 and a light guide module 4.

The card body 1 includes a panel 11 and a base plate 12, wherein the panel 11 is layered and assembled at the base plate 12. The panel 11 is provided with a light transmissive portion 111 and a first light shielding portion 112, and the base plate 12 is provided with a second light shielding portion 121, wherein the first light shielding portion 112 is opposite to the second light shielding portion 121.

The electronic control module 2 is disposed in the card body 1, and includes a circuit control carrier board 21 and a non-contact type radio-frequency (RF) antenna 22 or a contact type communication chip 23. The non-contact type RF antenna 22 is disposed at the circuit control carrier board 21, or the contact type communication chip 23 is disposed at the circuit control carrier board 21. In addition, the non-contact type RF antenna 22 and the contact type communication chip 23 may be both be disposed at the circuit control carrier board 21.

The light emitting module 3 is disposed in the card body 1 and is electrically connected to the circuit control carrier board 21.

The light guide module 4 is disposed in the card body 1 and corresponds to the light emitting module 3. The light guide module 4 includes a light source focusing portion 41 that corresponds to the light transmissive portion 111, and guides a light source of the light emitting module 3 to the light transmissive portion 111 by the light source focusing portion 41.

When the card body 1 performs personal data or transaction data exchange, a user may place the card body 1 close to a reading module to have the reading module sense the non-contact type RF antenna 22, or the user may insert the card body 1 into the reading module to have the reading module contact the contact type communication chip 23 (not shown), such that the electronic control module 2 acquires power provided by the reading module through the non-contact type RF antenna 22 or the contact type communication chip 23 and the electronic control module 2 is accordingly activated by the power, allowing the electronic control module 2 to perform personal data or transaction data exchange by the circuit control carrier board 21 in coordination with the non-contact type RF antenna 22 and the reading module, or allowing the electronic control module 2 to perform the personal data or transaction data exchange by the circuit control carrier board 21 in coordination with the contact type communication chip 23 and the reading module. Further, the light emitting module 3 is driven by the electronic control module 2 to enable the light emitting module 3 to emit a light source. With the coordination of shielding provided by the first light shielding portion 112 and the second light shielding portion 121, the light source can be reliably guided to the light transmissive portion 111 by the light source focusing portion 41. Thus, the card body 1 can emit the light source for display to thereby notify the user that the data exchange is currently in progress, achieving a prompt effect as well as providing an aesthetic visual effect.

In one embodiment of the present disclosure, the light transmissive portion 111 is located at a center of the first light shielding portion 112, the light source focusing portion 41 is located at a center of the light guide module 4 and corresponds to the light transmissive portion 111, and the light emitting module 3 is located around the light source focusing portion 41, such that the light guide module 4 guides the light source of the light emitting module 3 to the light transmissive portion 111 by the light source focusing portion 41.

In one embodiment of the present disclosure, the panel 11 and the light guide module 4 respectively have opening portions 113 and 42 corresponding to the contact type communication chip 23, such that the contact type communication type 23 is provided in an exposed manner at the card body 1. Thus, the contact type communication chip 23 can acquire power from the reading module by means of contacting, and perform personal data or transaction data exchange.

In one embodiment of the present disclosure, the electronic control module 2, the light emitting module 3 and the light guide module 4 are arranged between the first light shielding portion 112 and the second light shielding portion 121, and the light guide module 4 may be made of a transparent material such as PVC, PET, PC or PMMA.

On the basis of the above embodiments, when the light emitting module 3 emits the light source and the light guide module 4 guides the light source to the light transmissive portion 111 by the light source focusing portion 41, with the shielding provided by the first light shielding portion 112 and the second light shielding portion 121, the light source can be reliably guided to the light transmissive portion 111 by the light source focusing portion 41 of the light guide module 4, so that the light source for display is emitted at the center of the card body 1, thereby notifying the user that the data exchange is in progress, achieving a prompt effect as well as providing an aesthetic visual effect. In addition, the light guide module 4 may be made of a transparent material selected from PVC, PET, PC and PMMA, so that the light guide module 4 can adapt to different utilization requirements.

In one embodiment of the present disclosure, the panel 11 and the base plate 12 are combined by means of a loop light source focusing portion 13, which is connected to a periphery of the light guide module 4 and a periphery of the electronic control module 2. Thus, in the present disclosure, with the shielding provided by the first light shielding portion 112 and the second light shielding portion 121, the light source can be reliably guided to the light transmissive portion 111 by the light source focusing portion 41 of the light guide module 4 and guided to the loop light source focusing portion 13 by the light guide module 4, so that the light source for display is emitted at the center and the periphery of the card body 1, thereby notifying the user that the data exchange is in progress, achieving a prompt effect as well as providing an aesthetic visual effect.

In addition, the panel 11 and the base plate 12 may be made of a transparent material such as ABS, PETG, PVC or PET, the first light shielding portion 112 and the second light shielding portion 121 may be light shielding ink, and the light source focusing portion 41 and the loop light source focusing portion 13 may have luminous ink or photosensitive ink. Thus, with the effective light shielding provided by the first light shielding portion 112 and the second light shielding portion 121, the light source can be reliably guided to the light transmissive portion 111 by the light source focusing portion 41 of the light guide module 4 and guided to the loop light source focusing portion 13 by the light guide module 4, so that the light source for display is emitted at the center and the periphery of the card body 1, thereby notifying the user that the data exchange that is in progress, achieving a prompt effect as well as providing an aesthetic visual effect.

Moreover, the first light shielding portion 112 and the second light shielding portion 121 may be whole-surface non-light transmissive shielding layers, or a pattern (not shown) may be layered on the surfaces of the first light shielding portion 112 and the second light shielding portion 121, so that the card body 1 can better satisfy actual requirements.

In one embodiment of the present disclosure, the light emitting module 3 has one or more light emitters 31, and the light guide module 4 has one or more through holes 43 accommodating the light emitter(s) 31. In a preferred embodiment of the present disclosure, the light emitting module 3 may have four light emitters 31 arranged in a matrix, and the light guide module 4 may have four through holes 43 arranged in a matrix, wherein each through hole 43 is accommodated in each light emitter 31 and each light emitter 31 is a side light emitting diode having a light source path directed toward the light source focusing portion 41 and the loop light source focusing portion 13. In this embodiment, the light transmissive portion 111 is located at the center of the first light shielding portion 112, the light source focusing portion 41 is located at the center of the light guide module 4 and corresponds to the light transmissive portion 111, the loop light source focusing portion 13 is located around the light guide module 4 and around the electronic control module 2, and the light emitters 31 respectively correspond to positions on four corners of the light source focusing portion 41 and are located between the light source focusing portion 41 and the loop light source focusing portion 13. Thus, a light source can be emitted by each light emitter 31, and with the shielding provided by the first light shielding portion 112 and the second light shielding portion 121, the light source of each light emitter 31 can be reliably guided to the light transmissive portion 111 by the light source focusing portion 41 of the light guide module 4 and guided to the loop light source focusing portion 13 by the light guide module 4, so that the light source for display is emitted at the center and the periphery of the card body 1, thereby notifying the user that the data exchange is in progress, achieving a prompt effect as well as providing an aesthetic visual effect.

Figure 4:
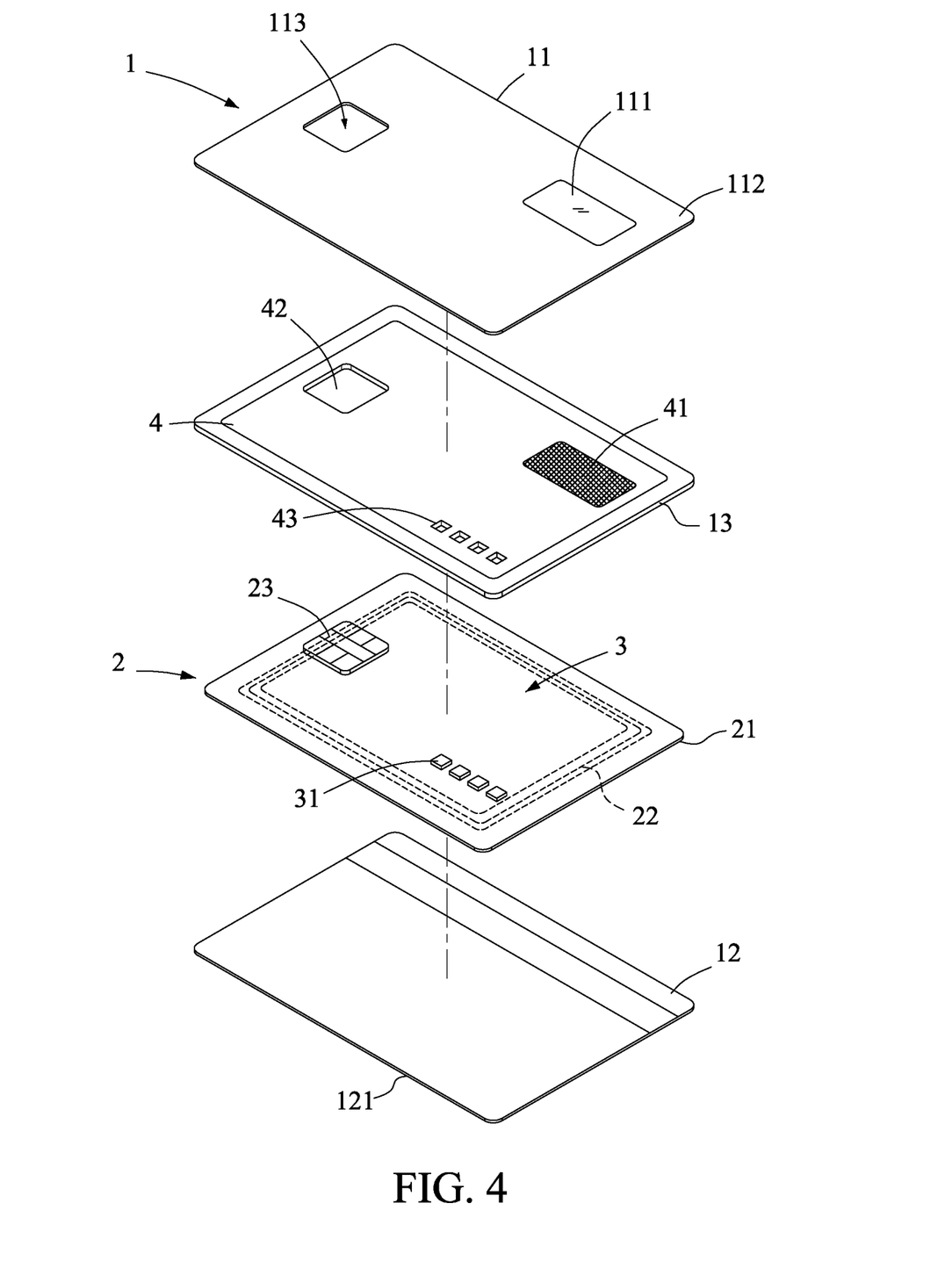
FIG. 4 is an exploded schematic diagram according to a second preferred embodiment of the present disclosure.
Figure 5:
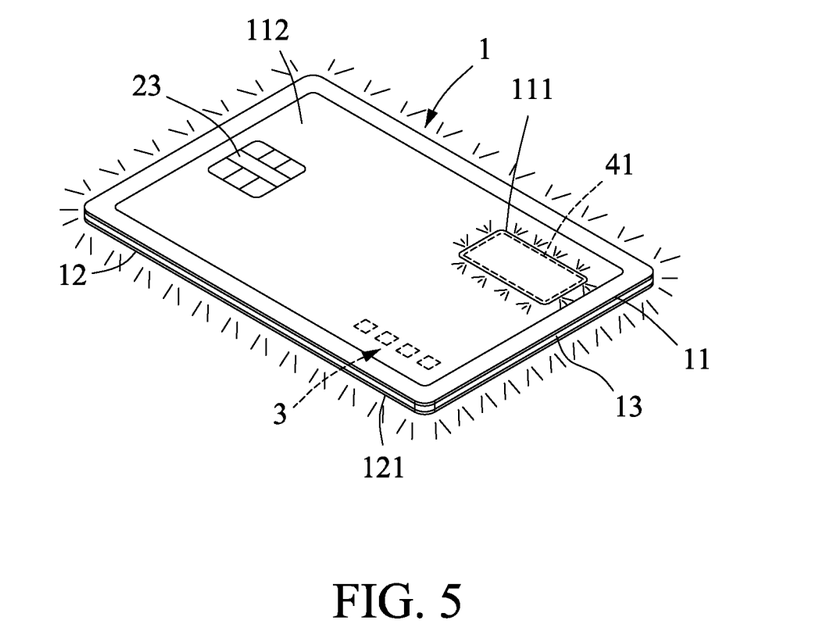
FIG. 5 is a schematic diagram of an appearance according to the second preferred embodiment of the present disclosure.

Refer to FIG. 4 and FIG. 5. As shown in the drawings, this embodiment differs from the above embodiments in that, the light transmissive portion 111 is located outside a center of the first light shielding portion 11, the light source focusing portion 41 is located outside a center of the light guide module 4 and corresponds to the light transmissive portion 111, and the light emitting module 4 is located on one side of the light source focusing portion 41 and within the loop light source focusing portion 13, such that the light guide module 4 guides the light source of the light emitting module 3 to the light transmissive portion 111 by the light source focusing portion 41, and the guides the light source of the light emitting module 3 to the loop light source focusing portion 13.

In a preferred embodiment of the present disclosure, the light emitting module 3 may have four light emitters 31 in a lateral arrangement, the light guide module 4 may have four through holes 43 in a lateral arrangement, and the through holes 43 respectively accommodate the light emitters 31, wherein each light emitter 31 is a side light emitting diode having a light source path directed toward the light source focusing portion 41 and the loop light source focusing portion 13; that is, each light emitter 31 corresponds to one side position of the light source focusing portion 41 and an inner edge of the loop light source focusing portion 13.

On the basis of the above embodiments, when the card body 1 performs personal data or transaction data exchange, a user may place the card body 1 close to a reading module to have the reading module sense the non-contact type RF antenna 22, or the user may insert the card body 1 into the reading module to have the reading module contact the contact type communication chip 23, such that the electronic control module 2 acquires power provided by the reading module through the non-contact type RF antenna 22 or the contact type communication chip 23 and the electronic control module 2 is accordingly activated by the power, allowing the electronic control module 2 to perform personal data or transaction data exchange by the circuit control carrier board 21 in coordination with the non-contact type RF antenna 22 and the reading module, or allowing the electronic control module 2 to perform the personal data or transaction data exchange by the circuit control carrier board 21 in coordination with the contact type communication chip 23 and the reading module. Further, the light emitting module 3 is driven by the electronic control module 2 to enable each emitter 31 of the light emitting module 3 to emit a light source. With the coordination of shielding provided by the first light shielding portion 112 and the second light shielding portion 121, the light source of each light emitter 31 can be reliably guided to the light transmissive portion 111 by the light source focusing portion 41 of the light guide module 4, so that the card body 1 can emit the light source for display to outside the center and at the periphery of the card body 1, thereby notify the user that the data exchange is currently in progress, achieving a prompt effect as well as providing an aesthetic visual effect.

Figure 6:
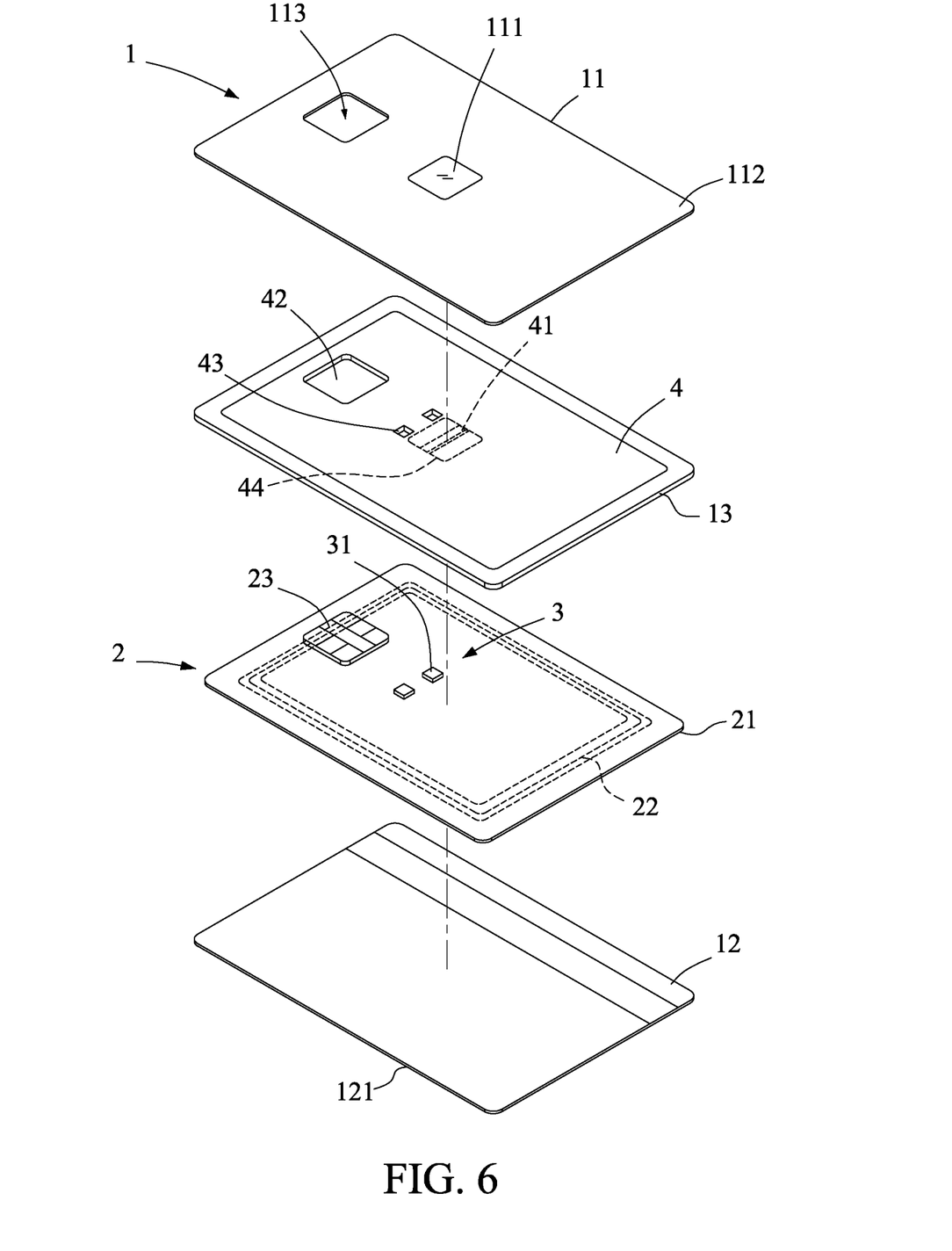
FIG. 6 is an exploded schematic diagram according to a third preferred embodiment of the present disclosure.
Figure 7:
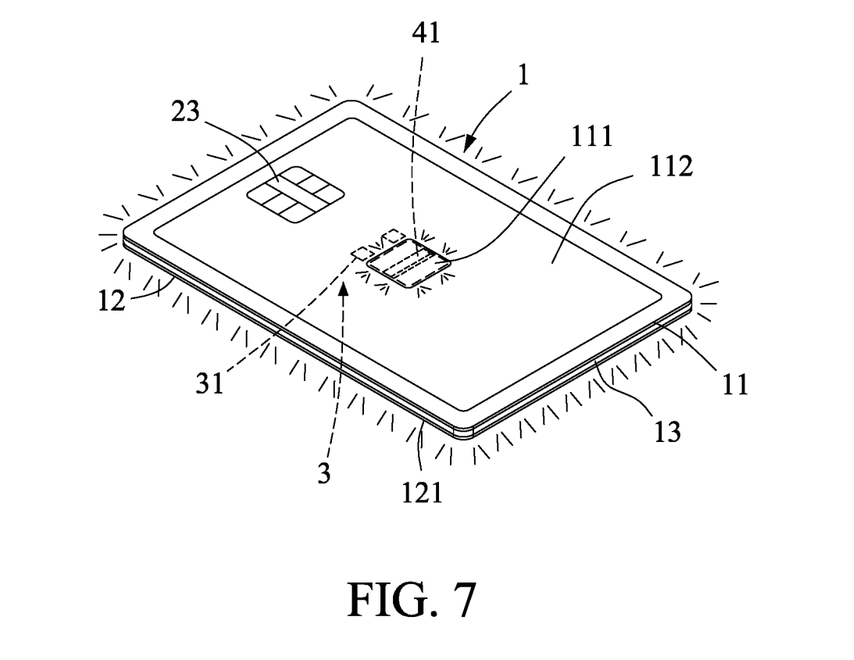
FIG. 7 is a schematic diagram of an appearance according to the third preferred embodiment of the present disclosure.
Figure 8:
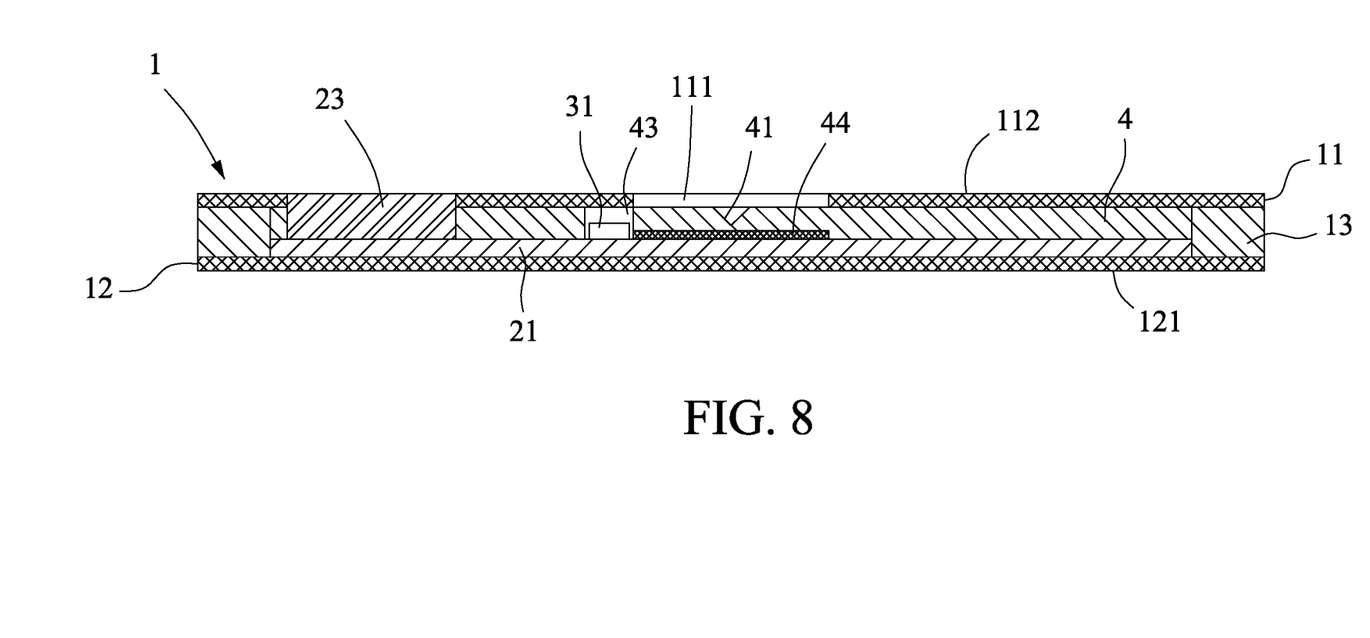
FIG. 8 is a section schematic diagram according to the third preferred embodiment of the present disclosure.

Refer to FIG. 6 to FIG. 8. As shown in the drawings, this embodiment differs from the above embodiments in that, the light source focusing portion 41 is a light focusing notch. In this embodiment, the light source focusing portion 41 may be a V-shaped light focusing notch having an opening directed toward the light transmissive portion 111. The light source of the light emitting module 3 is refracted by a long side of the light focusing notch to the light transmissive portion 111. The light guide module 4 further includes a photosensitive ink layer 44 that is located below the light source focusing portion 41. Moreover, in this embodiment, the light emitting module 3 may be provided with at least two light emitters 31 that correspond to the long side of the light focusing notch. On the basis of the above embodiments, when the card body 1 performs personal data or transaction data exchange, a user may place the card body 1 close to a reading module to have the reading module sense the non-contact type RF antenna 22, or the user may insert the card body 1 into the reading module to have the reading module contact the contact type communication chip 23, such that the electronic control module 2 acquires power provided by the reading module through the non-contact type RF antenna 22 or the contact type communication chip 23 and the electronic control module 2 is accordingly activated by the power, allowing the electronic control module 2 to perform personal data or transaction data exchange by the circuit control carrier board 21 in coordination with the non-contact type RF antenna 22 and the reading module, or allowing the electronic control module 2 to perform the personal data or transaction data exchange by the circuit control carrier board 21 in coordination with the contact type communication chip 23 and the reading module. Further, the light emitting module 3 is driven by the electronic control module 2 to enable each emitter 31 of the light emitting module 3 to emit a light source. With the coordination of shielding provided by the first light shielding portion 112 and the second light shielding portion 121, the light source of each emitter 31 can be reliably refracted upward by the light source focusing portion 41 of the light guide module 4, reflected in coordination by the photosensitive ink layer 44, and further guided to the light transmissive portion 111, so that the card body 1 can emit the light source for display at the center and at the periphery of the card body 1, thereby notify the user that the data exchange is currently in progress, achieving a prompt effect as well as providing an aesthetic visual effect.

The present invention is described by way of the preferred embodiments above. A person skilled in the art should understand that, these embodiments are merely for describing the present invention are not to be construed as limitations to the scope of the present invention. It should be noted that all equivalent changes, replacements and substitutions made to the embodiments are to be encompassed within the scope of the present invention. Therefore, the scope of protection of the present invention should be accorded with the broadest interpretation of the appended claims.

What is claimed is:

1. A light emitting electronic card, comprising:
a card body, comprising a panel and a base plate, the panel layered and assembled at the base plate, the panel provided with a light transmissive portion and a first light shielding portion, the base plate provided with a second light shielding portion, the first light shielding portion being opposite to the second light shielding portion;
an electronic control module, disposed in the electronic card, the electronic control module comprising a circuit control carrier board and a non-contact type radio-frequency (RF) antenna or a contact type communication chip, the non-contact type RF antenna disposed at the circuit control carrier board, or the contact type communication chip disposed at the circuit control carrier board;
a light emitting module, disposed in the card body and electrically connected to the circuit control carrier board; and
a light guide module, disposed in the card body and corresponding to the light emitting module, the light guide module comprising a light source focusing portion that corresponds to the light transmissive portion, the light guide module guiding a light source of the light emitting module to the light transmissive portion by the light source focusing portion.

2. The light emitting electronic card according to claim 1, wherein the electronic control module, the light emitting module and the light guide module are arranged between the first light shielding portion and the second light shielding portion.

3. The light emitting electronic card according to claim 1, wherein the light transmissive portion is located at a center of the first light shielding portion, the light source focusing portion is located at a center of the light guide module and corresponds to the light transmissive portion, and the light emitting module is located around the light source focusing portion, such that the light guide module guides the light source of the light emitting module to the light transmissive portion by the light source focusing portion.

4. The light emitting electronic card according to claim 1, wherein the light transmissive portion is located outside a center of the first light shielding portion, the light source focusing portion is located at a center of the light guide module and corresponds to the light transmissive portion, and the light emitting module is located on one side of the light source focusing portion, such that the light guide module guides the light source of the light emitting module to the light transmissive portion by the light source focusing portion.

5. The light emitting electronic card according to claim 1, wherein the light emitting module comprises at least one light emitter, and the light guide module has at least one through hole that accommodates the light emitter, the light emitter is a side light emitting diode having a light source path directed toward the light source focusing portion.

6. The light emitting electronic card according to claim 1, wherein the light source focusing portion has luminous ink or photosensitive ink.

7. The light emitting electronic card according to claim 1, wherein the panel and the base plate are combined by means of a loop light source focusing portion, which is connected to a periphery of the light guide module and a periphery of the electronic control module.

8. The light emitting electronic card according to claim 7, wherein the loop light source focusing portion has luminous ink or photosensitive ink.

9. The light emitting electronic card according to claim 1, wherein the light source focusing portion is a light focusing notch, and the light source of the light emitting module is refracted by a long side of the light focusing notch to the light transmissive portion.

10. The light emitting electronic card according to claim 9, wherein the light guide module further comprises a photosensitive ink layer, which is located below the light source focusing portion.

* * * * *